United States Patent [19]

Van Dine et al.

[11] Patent Number: 5,659,417

[45] Date of Patent: *Aug. 19, 1997

[54] ELECTROCHROMIC STRUCTURES AND METHODS

[75] Inventors: John E. Van Dine, Mahwah; V. D. Parkhe, Edison; Lisa C. Klein, Highland Park; Forrest A. Trumbore, Summit, all of N.J.

[73] Assignee: Sun Active Glass Electrochromics, Inc., Valley Cottage, N.Y.

[*] Notice: The term of this patent shall not extend beyond the expiration date of Pat. No. 5,404,244.

[21] Appl. No.: 470,743

[22] Filed: Jun. 6, 1995

Related U.S. Application Data

[60] Division of Ser. No. 996,730, Dec. 24, 1992, abandoned, which is a continuation-in-part of Ser. No. 866,606, Apr. 10, 1992, Pat. No. 5,404,244.

[51] Int. Cl.⁶ .................................................. G02F 1/153
[52] U.S. Cl. ................................................ 359/273; 359/270
[58] Field of Search ................................. 359/265, 270, 359/273, 274

[56] References Cited

U.S. PATENT DOCUMENTS

| | | | |
|---|---|---|---|
| 4,060,311 | 11/1977 | Green | 359/267 |
| 4,256,379 | 3/1981 | Green | 359/270 |
| 4,266,335 | 5/1981 | Matsumoto et al. | 29/592.1 |
| 4,573,768 | 3/1986 | Polack et al. | 359/270 |
| 4,824,222 | 4/1989 | Green | 359/275 |
| 4,828,369 | 5/1989 | Hotomi | 359/270 |
| 4,867,541 | 9/1989 | Hotomi | 359/265 |
| 4,876,628 | 10/1989 | Goldner et al. | 341/51 |
| 4,902,110 | 2/1990 | Green | 359/275 |
| 4,938,571 | 7/1990 | Cogan et al. | 359/275 |
| 4,960,324 | 10/1990 | Brown | 359/265 |
| 4,996,083 | 2/1991 | Moser et al. | 427/108 |
| 5,016,991 | 5/1991 | Mason | 359/265 |
| 5,019,420 | 5/1991 | Rauh | 427/126.3 |
| 5,028,124 | 7/1991 | Akhtar | 359/265 |
| 5,130,842 | 7/1992 | Gauthier et al. | 359/265 |
| 5,133,594 | 7/1992 | Haas et al. | 359/275 |
| 5,138,013 | 8/1992 | Mason | 528/27 |
| 5,274,493 | 12/1993 | Coupert et al. | 359/275 |
| 5,352,504 | 10/1994 | Boulanger et al. | 428/216 |

FOREIGN PATENT DOCUMENTS

| | | |
|---|---|---|
| 2593321 | 7/1987 | France . |
| 2909359 | 9/1979 | Germany . |
| 2221106 | 9/1990 | Japan . |

OTHER PUBLICATIONS

Patent Abstracts of Japan, vol. 14, No. 531, Feb. 21, 1989, JP-A-02221106, Sep. 4, 1990.
Patent Abstracts of Japan, vol. 16, No. 356, Jul. 31, 1992, JP-A-04108630, Apr. 9, 1992.
Patent Abstracts of Japan, vol. 16, No. 329, Jul. 17, 1992, JP-A-0409855, Mar. 25, 1992.
Solid State Ionics, vol. 28-30, Sep. 1988, Amsterdam, NL, pp. 1722-1725, P. Judeinstein et al., "An 'All Gel' Electrochromic Device."

*Primary Examiner*—Georgia Y. Epps
*Assistant Examiner*—Thomas Robbins
*Attorney, Agent, or Firm*—Lerner, David, Littenberg, Krumholz & Mentlik

[57] ABSTRACT

Electrochromic devices applied to a substrate are disclosed, including an electrochromic electrode layer, a counterelectrode layer, and an ion-conducting layer sandwiched between those two layers and electrically isolating them from each other, in which the ion-conducting layer is substantially uniform across the substrate and comprises an inorganic superstructure with associated organic material and with a microstructure which facilitates the transfer of ions. Methods for producing these devices are also disclosed, including depositing the ion-conducting layer on the substrate in the form of a solution, and effecting gelation of that solution.

31 Claims, 1 Drawing Sheet

ELECTROCHROMIC STRUCTURES AND METHODS

CROSS REFERENCES TO RELATED APPLICATIONS

This is a division, of application Ser. No. 07/996,730 filed Dec. 24, 1992 now abandoned, which is a CIP of application Ser. No. 07/866,606, filed on Apr. 10, 1992 which is now U.S. Pat. No. 5,404,244.

FIELD OF THE INVENTION

The present invention relates to electrochromic devices. More particularly, the present invention relates to monolithic electrochromic devices through which energy, including light, can be transmitted, reflected or absorbed under controlled conditions. More particularly, the present invention relates to methods for the preparation of electrochromic devices.

BACKGROUND OF THE INVENTION

A variety of chromogenic materials are available for controlling the through passage of energy. The various types of such devices operate "chromatically" by producing a change in optical properties in accordance with an applied stimulus or excitation.

Thus, thermochromic devices change their optical properties in response to changes in temperature. Photochromic devices, on the other hand, change their optical properties in response to changes in the intensity and wavelength of light impinging thereon. In each of these cases, however, the degree of coloration effected is dependent upon external effects, and the user has only limited control thereover. Accordingly, there has been a considerable effort to develop chromogenic materials which undergo reversible coloration induced by applying electric fields or currents, and these are known as electrochromic materials. These solid state inorganic electrochromic layers include those that effect color change due to the dual injection of electrons and ions, typically Group VI-B oxides, such as $WO_3$ and $MoO_3$.

These electrochromic devices, while highly desirable particularly for the manufacture of large area electrochromic devices, such as for architectural windows, skylights and other transparent-substrate-based products, in order to be of practical use, require sequential combination with other material layers which together form the electrochromic device. These devices thus include layers of the electrochromic material, an ion-conducting material, a counterelectrode material, and electron conducting material layers thereabout. The current state of the art for the formation of these thin film devices, including multi-component oxide material layers, has not been capable of providing truly practicable devices to date. These current film formation methods include vacuum deposition techniques such as sputtering, thermal and electron beam evaporation and plasma-enhanced chemical vapor deposition. These processes, however, are not cost effective in terms of manufacturing operations, particularly for large area electrochromic structures, since they suffer from at least one of the following drawbacks:

(a) slow deposition rates of the oxide materials required therein;

(b) non-uniformity of the deposition in terms of both the thickness of the layers, and their chemical compositions;

(c) a limited control of the chemical composition and microstructure;

(d) limited selection of starting materials;

(e) low yield; and (f) the need for extensive maintenance.

It has, therefore, been economically difficult to produce electrochromic device panels with surfaces of the type particularly required for architectural windows, skylights and other transparent substrate-based products.

In U.S. Pat. No. 4,996,083 electrochromic films are disclosed, and in particular, in which the electrochromic films are produced from solutions. Thus, in accordance with this patent, films such as the $WO_3$ coatings and other metal oxides are produced from an anhydrous transition metal halide and an alcohol.

Other electrochromic devices are also known which include an ion-conducting layer which comprises an organic polymer, such as those disclosed in U.S. Pat. No. 4,876,628. These devices also have proven unsatisfactory, and uneconomical.

The search has, therefore, continued for electrochromic devices and methods for producing them which will facilitate the economical manufacture of large area electrochromic devices and effectively do so at acceptable cost levels.

SUMMARY OF THE INVENTION

In accordance with the present invention, these and other objects have now been realized by the invention of an electrochromic device deposited on a substrate comprising an electrochromic layer acting as a first electrode, a counterelectrode layer acting as a second electrode, and an ion-conducting layer between the first and second electrodes, the ion-conducting layer having a substantially uniform thickness and primarily comprising an inorganic material with associated residual hydroxyl and/or organic material, and having a microstructure facilitating the transfer of said ions therethrough. Preferably, the ion-conducting layer is in direct contact with and electrically insulates the first and second electrodes. In accordance with a preferred embodiment of the electrochromic devices of the present invention, the electrochromic layer and/or the counterelectrode layer include residual hydroxyl and/or organic materials therein.

In accordance with a preferred embodiment of the electrochromic devices of the present invention, the ion-conducting layer comprises either a lithium ion-conducting layer or a hydrogen ion-conducting layer. In the case of the lithium ion-conducting layer, the ion-conducting layer preferably comprises a lithium-based ceramic material.

In accordance with a preferred embodiment of the electrochromic devices of the present invention, an electrochromic device applied to a substrate is provided, comprising an electrochromic layer acting as the first electrode, a counterelectrode layer acting as the second electrode, an ion-conducting layer between the first and second electrodes, the ion-conducting layer having a substantially uniform thickness and primarily comprising inorganic material with associated residual hydroxyl and/or organic material and having a microstructure facilitating the transfer of said ions therethrough, and first and second transparent conductive layers in contact with the electrochromic layer and the counterelectrode layer, respectively, for facilitating the flow of electrons therebetween.

In accordance with another embodiment of the present invention, a method is provided for the preparation of an electrochromic device deposited on a substrate comprising depositing an electrochromic layer acting as the first electrode on the substrate, depositing a counterelectrode layer acting as the second electrode on the substrate, and depositing an ion-conducting layer between the first and second electrodes by depositing the ion-conducting layer on either electrode in the form of an ion-conducting layer precursor solution and effecting gelation of the ion-conducting layer precursor solution. Preferably, the substrate upon which the electrochromic device is applied is a transparent glass or plastic.

In accordance with a preferred embodiment of the method of the present invention, the ion-conducting layer precursor solution includes at least one metal in the form of a metal organic or metal salt compound. When a metal organic compound is used it preferably comprises a metal alkoxide, such as an alkali metal alkoxide. In a preferred embodiment, the provision of the electrochromic layer and/or of the counterelectrode layer comprises providing the electrochromic and/or counterelectrode layers in the form of solutions and effecting gelation of these solutions. In both cases, these solutions preferably include at least one metal in the form of a metal organic or metal salt compound, again most preferably a metal alkoxide.

In accordance with a preferred embodiment of the method of the present invention, the method includes reducing at least one of the electrochromic and/or counterelectrode layers by inserting said ions thereinto. In a preferred embodiment a subsequent heat treatment step is then carried out thereon, preferably comprising treating the electrochromic device in a vacuum or in an inert atmosphere, preferably at temperatures above about 100° C., and most preferably above about 150° C.

In accordance with a preferred embodiment of the method of the present invention, the ion-conducting layer is deposited on one of the electrodes on the substrate by depositing an ion-conducting layer precursor solution and effecting gelation thereof by applying the ion-conducting layer precursor solution to the substrate and effecting the condensation and hydrolysis thereof. Preferably, applying the ion-conducting layer precursor to one of the electrodes on the substrate includes removing the substrate from the ion-conducting layer precursor solution at a controlled rate so as to obtain a coating of controlled thickness thereon. In another embodiment, the hydrolysis step comprises exposing the coating of the ion-conducting precursor solution thereon to a controlled environment during evaporation of the solvent. Most preferably, the method includes heating the hydrolyzed ion-conducting layer.

In accordance with this invention, one or more of the electrochromic, counterelectrode and ion-conducting layers, but at least the ion-conducting layer, are produced from a solution, preferably utilizing a sol-gel process. Thus, these one or more thin films are produced by first preparing a mixture of one or more alkoxides in a solvent therefor, and then treating the surface which is to be coated with the alkoxide solution. Application of these films can be accomplished by conventional dipping of the surface, or spin coating techniques. Subsequently, the coated film is then hydrolyzed and condensed while the solvent evaporates, and then heat treated to obtain a dense film thereon. Preferably, the surface is sequentially coated with the appropriate alkoxide solution to prepare a thin film of controlled thickness thereon, and each such film is hydrolyzed and condensed, and heat treated prior to application of the next such film thereto.

It has been surprisingly discovered that the presence of residual hydroxyl and/or organic or carbon-containing groups therein, in the lithium based ion-conducting layer does not degrade the chromogenic performance of the finished electrochromic device. This is particularly surprising in view of the fact that in such layers, such as lithium silicates and the like, one of ordinary skill in this art would have expected that such fugitive materials would have created problems with the migration of colorant ions therethrough. In this case, however, not only is this not a problem, but the surprisingly significant results and the ability to economically and far more readily produce such a thin film coating of the ion-conducting layer, and ultimately of the multi-layered structure of the electrochromic device hereof, has now been achieved.

BRIEF DESCRIPTION OF THE DRAWINGS

The present invention can be more fully appreciated in connection with the following detailed description, in which reference is made to the drawings in which.

DETAILED DESCRIPTION

Figure 1:
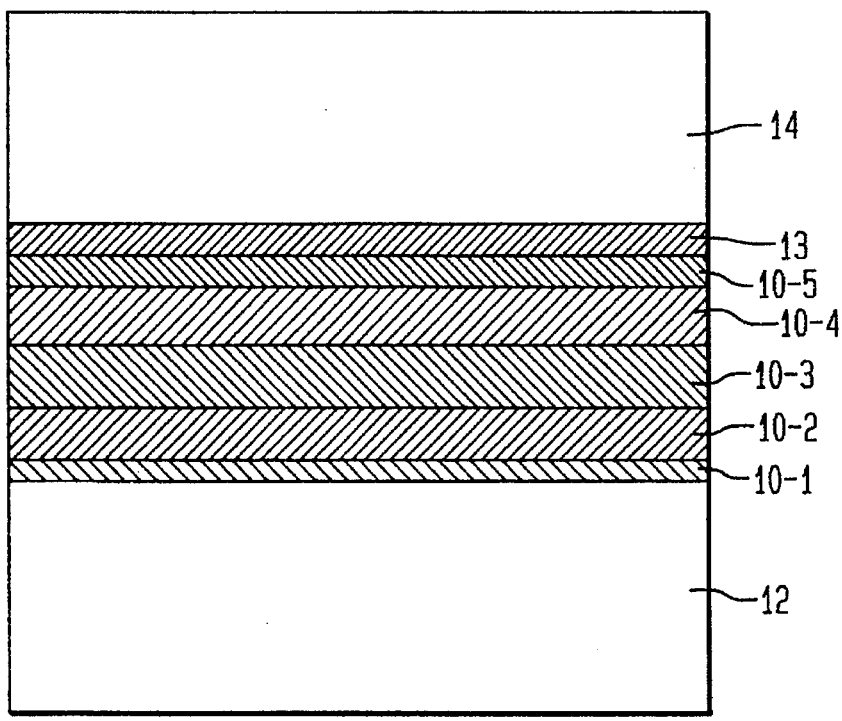
FIG. 1 is a side, elevational, cross-sectional view of an electrochromic device produced in accordance with the present invention.

Referring to the Figures, in which like numerals refer to like portions thereof, FIG. 1 is a cross-sectional view of an electrochromic device employed in a window 10. In the case of window 10, the substrate 12 is glass. In other applications, however, other transparent substrates can be used, including plastic and the like. In any event, in the case of window 10, the electrochromic device 16 is sandwiched between glass substrate 12 and a second substrate 14, also preferably comprising a glass substrate. In this manner, the window 10 is electrochromic in the sense that the transparency of the area exposed to external illumination or radiation can be controlled electrically or electronically. For this purpose, the occupant of a room or compartment containing the window, such as a skylight or the like, can operate electrical controls in order to achieve a desired degree of darkness or lightness. It will, therefore, be appreciated, that although the invention is illustrated in terms of a window or skylight, it is equally applicable to other areas requiring control of illumination in transmission and/or reflection. Numerous other applications thus include sun glasses, mirrors and the like. In any event, by virtue of the electrical control over transparency, a window, for example, can be in its completely darkened state during the day or even during periods of evening darkness as and when desired.

As is shown in FIG. 1, the window 10 itself includes the electrochromic device 16 comprising a series of layers of thin films deposited on the substrate 12. These include a first transparent conductive layer 18, an electrochromic layer 20, an ion-conducting layer 22, a counterelectrode layer 24, and a second transparent conductive layer 26. The device shown in FIG. 1 can be completed by being adhered to an additional substrate 14 using a convenient medium 28, which can be a laminating transparent adhesive, such as ethylene vinyl acetate or polyvinyl butyral. This adhesive layer can also serve as a vapor barrier.

One or more of layers 18, 20, 22, 24 and 26, but at least ion-conducting layer 22, is applied to layer 20 (or to layer 24, depending upon the sequence adopted for application of these layers) from a solution, preferably using a "sol-gel" technique, employing techniques such as dipping, spinning, roll coating, curtain coating, premetered slot techniques, or the like. Preferably, each of these layers is deposited on the substrate (i.e., on the preceding layer) using this technique. However, it is within the scope of the present invention for layers other than ion-conducting layer 22, and particularly including electrochromic layer 20 and counterelectrode layer 24, to be applied by conventional techniques, such as by the vapor deposition techniques and the like discussed above.

The transparent conductive layers 18 and 26 are transparent yet conductive thin films which preferably have a low sheet resistance, such as less than about 10 ohms per square, and preferably less than about 5 ohms per square. Preferably, tin doped indium oxide (ITO) coatings are used, although other such coatings can be utilized, including fluorine-doped tin oxide, doped zinc oxide, and the like. These conductive films are connected to a conventional DC current source (not shown) in a conventional manner.

The active electrochromic layer 20 is then applied to layer 18 on substrate 12. The electrochromic layer changes color in a completed device when electrical current is applied thereto. It is thus normally transparent or colorless, but when reduced by the insertion of an electron and charge-compensating ion becomes colored due to a change in absorption, reflectance, or a combination thereof. (Therefore, these ions can also be referred to as "colorant" ions.) Thus, the ability of this layer to change its transparency and transmit light is a direct function of the number of guest species, such as lithium or hydrogen ions, in that layer. The preferred electrochromic layer 20 is tungsten oxide ($WO_3$), but other such electrochromic layers can include various transition metal oxides, such as niobium oxide, titanium oxide, molybdenum oxide, nickel oxide, iridium oxide, and solid solution mixtures of such oxides.

The ion-conducting layer 22 is then applied to layer 20. This layer is transparent in the visible range, and preferably has a high electrical resistivity and high ionic conductivity. Thus, this electrically insulating ion-conducting layer 22 electrically isolates the electrochromic layer 20 from the counterelectrode layer 24. The ion-conducting layer 22 allows ions but not electrons to pass through it, and thus provides a device with "memory." The ion-conducting layer of the present invention, formed in accordance with the method of the present invention from a solution as discussed below, primarily comprise a layer of inorganic material which is prepared from and includes residue from organic constituents. Thus, the ion-conducting layer 22 is primarily exclusively inorganic material, possibly with a small amount of the hydroxyl and/or organic residue, primarily the residue of the alkoxide groups used to prepare this layer and/or residual solvent, associated with the inorganic material thereof. In general, there will be less than about 1 wt. % of any such hydroxyl and/or organic residue. The precise amount will be calculable by one of ordinary skill in this art based upon his knowledge of the surface area, and the deposition conditions for the particular thin film in question. The thin films of this invention are not generally extremely high surface area sol-gel systems, and can thus have surface areas as low as about 1 $m^2$/gram, although higher surface area films can be utilized.

The finished layer 22 itself comprises a silicate-based structure, which again is capable of conducting the ions, preferably lithium ions or protons, used in connection with the electrochromic devices hereof. Suitable ion conductors particularly adapted for lithium ion transmission include lithium silicate, lithium aluminum silicate, lithium aluminum borate, lithium borate, lithium zirconium silicate, lithium niobate, lithium borosilicate, lithium phosphosilicate, lithium nitride, lithium aluminum fluoride, and other such lithium-based ceramic materials. As indicated, other suitable ion-conducting electrolytes can be used, such as silicon dioxide or tantalum oxide, for protron (hydrogen) based electrochromic devices.

The ion-conducting layer 22 hereof, because of the solution-based methods used for the preparation thereof, can have a carefully controlled thickness. It is, therefore, possible to produce such layers of the desired thickness (i.e., thick enough to provide the required electrical insulation), but of no greater than such desired thickness, so as to avoid the need to apply thicker than necessary ion-conducting layers. These thicker layers can thus be overly cumbersome and expensive, and can also slow down the "switching" time, or rate at which the electrochromic devices hereof can convert to a tinted (reduced) or bleached condition. In particular, these ion-conducting layers can thus preferably be between about 200 to 5,000 Angstroms thick, and more preferably be between about 500 to 2,000 Angstroms thick. This can be contrasted, for example, to many of the prior art devices which employ a polymeric electrolyte layer in the form of a laminate, and thus have a far greater thickness; e.g., on the order of about 10 microns or more.

The next layer applied to ion-conducting layer 22 is the counterelectrode layer 24. The counterelectrode layer, which can be electrochromic in that it may change color when electrical current is applied thereto, is not necessarily electrochromic. In any event, the purpose of the counterelectrode layer is primarily to store the colorant ions, such as lithium or hydrogen ions, when not employed in the electrochromic layer 20. When the counterelectrode materials are also electrochromic in that they change their shade or transparency as atoms move in and out of them, these materials may act to complement the coloration of the electrochromic layer 20. Particularly preferred such materials for the counterelectrode layer include vanadium pentoxide ($V_2O_5$), niobium oxide, indium oxide, nickel oxide, nickel hydroxide, iridium oxide, cobalt oxide, molybdenum oxide, and mixtures of these materials, such as chromium-vanadium oxide and the like. Thus, in a preferred embodiment, the counterelectrode layer has a general formula $A_x(MO)$, where MO is a mixture of vanadium oxide or chromium oxide together or with oxides of an additional material, such as niobium, titanium, tantalum or the like. A is an atom identical to the insertion or colorant ion in the electrochromic layer, and the transported ion through the ion-conducting layer. These mixed oxides have superior reduced state visible light transmission as compared to $V_2O_5$ and may be oxidized and reduced with, for example, Li+ insertion ions many times in a reversible manner without loss of activity or without change in optical properties.

Finally, another transparent conductive material layer 26 in accordance with the present invention, again such as the indium tin oxide coatings and the like discussed above, is then deposited thereon.

Prior to completion of the window 10, it is necessary to introduce the colorant ion into the device, and most particularly into at least one of the electrochromic layer 20 and/or counterelectrode layer 24. In effect, at least one of these two layers is chemically reduced by the insertion of colorant atoms, such as lithium or atomic hydrogen thereinto, unless there is already a source of these atoms within one of these constituents. Thus, the electrochromic and/or counterelectrode layers can be deposited in such a reduced state. This can be done, for example, by direct vapor deposition of $Li_xV_2O_5$ (or another counterelectrode), its reduction by elemental Li in a separate step, or electrochemical reduction of the counterelectrode layer in an electrolytic solution of Li+. Similarly, the Li can also be initially introduced into the electrochromic layer (e.g., $WO_3$) using similar methods.

If the electrochromic and/or counterelectrode layers are to be reduced subsequent to their deposition, this can be accomplished in a conventional manner by treatment with an appropriate reducing agent, such as n-butyl lithium in the case of lithium ions, or sulfuric acid in the case of hydrogen ions.

In a preferred embodiment of the invention, the completed device is subjected to a heat treatment process. This heat treatment procedure is carried out subsequent to fabrication of the device; i.e., after the electrochromic layers have been deposited and at least one of the electrochromic layer and/or counterelectrode layers has been reduced in the manner discussed above. Carrying out the heat treatment process at this point has a positive effect on the switching characteristics of the electrochromic devices hereof; i.e., between its bleached and reduced states, as well as upon the overall optical properties thereof. The treatment itself preferably occurs in a vacuum or an inert atmosphere, and preferably occurs at temperatures above about 100° C., preferably above about 150° C., and most preferably between about 200° and 300° C.

Figure 2:
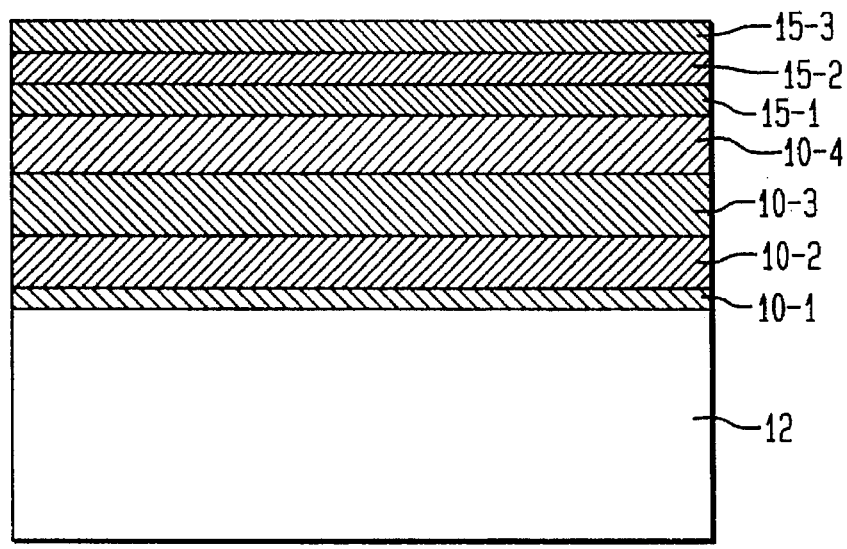
FIG. 2 is a side, elevational cross-sectional view of another embodiment of an electrochromic device produced in accordance with the present invention.

Turning to FIG. 2, another embodiment of the electrochromic device of the present invention is shown. In this case, in which all of the like reference numerals refer to like portions thereof, upon the substrate 12, preferably glass, are applied the same first conductive oxide layer 18, electrochromic layer 20, ion-conducting layer 22, and counterelectrode layer 24, as discussed above. However, in this case, instead of the second conductive oxide layer 26, as shown in FIG. 1, there is applied a thin metal layer 32, preferably silver or the like. Furthermore, intermediate the counterelectrode layer 24 and the silver layer 32 is applied a thin primer layer for the silver comprising a thin metal layer or barrier layer preventing direct contact between the silver layer 32 and the counterelectrode layer 24, such as a thin layer of copper, titanium, nickel or the like. In this case, it is then essential to apply an optical tuning layer 34 thereto. Optical tuning layer 34, which can comprise a metal oxide layer, such as indium tin oxide, zinc oxide, zirconium oxide or the like, is provided in accordance with the disclosure of co-pending application Ser. No. 07/754,650 filed on Sep. 4, 1991.

As noted above, in accordance with this invention, at least the ion-conducting layer 22, and possibly also each of the additional layers of the electrochromic devices of the present invention, are applied by a method which employs a solution; i.e., as opposed to the prior deposition techniques, such a sputtering and the like. In the case of deposition of a metal oxide, such a layer can be deposited employing this technique by providing the metal in the form of an alkoxide in an organic solvent, such as an alcohol. In particular, the alcohol used can be a $C_1$ to $C_5$ alcohol, and most preferably a $C_1$ to $C_3$ alcohol. Thus, the preferred alcohols are methanol, ethanol, propanol, isopropanol, and mixtures thereof. The butyl and pentyl alcohols are broadly operable, but the higher alcohols, and sometimes even the butyl and pentyl alcohols will sometimes result in metal precipitates. In some cases, other protic or aprotic organic solvents can be used, such as formamide, dimethyformamide, or tetrahydrofuran. In the case of the electrochromic layer and/or the counterelectrode layer, the solution technique disclosed in U.S. Pat. No. 4,996,083, particularly as set forth therein from column 3, lines 1 through 68, the disclosure of which is incorporated herein by reference thereto, can be employed. In the case of the ion-conducting layer, there are a number of alternatives. It must first be noted that for the purposes of this invention, the term "metal" includes all of the conventional metallic compounds, but also those "metals" of Groups III-A and IV-A of the Periodic Table of the Elements, such as silicon, boron, aluminum, tin, and the like. Therefore, throughout this specification, and in the claims hereof, this term will have such an inclusive meaning. In any event, the metal component can be provided in the form of a metal organic compound, such as a metal alkoxide or the like, including the alkali metal alkoxides or a metal aryloxide. Thus, the metal or alkali metal alkoxides can include the $C_1$ to $C_3$ alkoxides, primarily the methoxides and ethoxides, since longer chain alkoxides tend to present steric problems. The aryloxides can include the phenoxides and the like. Furthermore, in the case of metals such as silicon, organic tetra-alkoxy silanes, such as tetraethylorthosilicate, are preferred. However, it is possible to use organic tri- or di-alkoxy silanes, of the formulae $R'Si(OR)_3$ or $R'_2Si(OR)_2$ in which R' is a non-hydrolyzuae organic substrate. These compounds can include, for example, tetra-n-butoxy silane and tetra-n-propoxy silane. In general, most sol-gel materials are polymeric metal oxides. Thus, the initial reactants or precursors for these are most often metal alkoxides which are converted by hydrolysis and condensation sequentially into a sol (a suspension or dispersion of discrete colloidal particles) and into a gel (a colloidal or polymeric solid containing a fluid component).

Thus, a typical metal oxide gel is prepared from a metal alkoxide in the following manner:
Hydrolysis reaction:

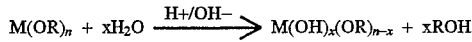

Condensation Reactions:
Dehydration: -M-OH+HO-M-→-M-O-M-+$H_2O$
Dealcoholation: -M-OH+RO-M-→-M-O-M-+ROH While this example has employed water as the conventional initiator for the hydrolysis reaction hereof, it will be understood that other sources of hydroxyl ions could be substituted for water. For example, one might utilize polyethylene glycol compounds including at least one hydroxyl group per molecule for such purposes, and in that case potentially employ a non-aqueous medium.

Following transition of the solution into the sol-gel state, careful thermal processing then leads to the stabilized porous glass monolith. The most common sol-gel system are based on silica, and hydrolyzed tetraethylorthosilicate (TEOS=$Si(OC_2H_5)_4$) has been used as an adhesive, for example. Dependent upon the amount of solvent and catalyst present, hydrolysis and the related reactions can go to completion with, in the case of hydrolysis, the —OR groups replaced by the hydroxyl groups, —OH. In addition to the metal organo compounds, inorganic precursors can also be hydrolyzed in this manner.

Upon partial or full hydrolysis, the molecules are then able to link together in a condensation reaction liberating small scale molecules such as water and/or alcohol. The reaction can then continue to build molecules. Condensation that takes place then results in a colloidal cross-linked polymer known as a sol.

Colloidal sols are particulate where non-polymeric solid particles are dispersed into a fluid. Particulate silica sols are typically formed in aqueous solutions. Polymeric silica sols, on the other hand, are obtained from the hydrolysis of alkoxides in largely non-aqueous solutions. Silica tends to form polymeric sols, but most other oxides form particulate sols.

In substantially non-aqueous solutions of alkoxides and alcohol, the solubility of the solid phase is limited, and the condensation reaction is essentially irreversible. When a molecule thus reaches macroscopic dimensions and extends throughout the solution, a gel point is reached when the last bond is formed to complete the molecule. The resulting gel has a continuous gelatin phase enveloping a continuous liquid phase. The continuity of this skeleton provides elasticity. A polymeric gel is formed from particulate sols when attractive dispersion forces cause the particles to adhere and form a network.

In general, a gel is a two-phase semi-solid containing liquid in a fluid phase of colloidal dimensions. The type of bonding is not characteristic, since the bonds may be reversible or permanent, as in polymeric systems. When the gel process begins, particulate aggregates are formed that grow, impinging on one another and then linking together by percolation. In the other gel point, bonds form at random. Gelation after casting produces a monolith, while gelation after coating on a substrate with rapid evaporation of solvent produces films.

While gels are generally amorphous, they may crystallize on heating at high temperatures by the collapse of pores. When amorphous gels are sufficiently heated, the transport of atoms is by viscous flow and the result is viscous sintering. In crystalline materials, the sintering is by relatively slow diffusion.

In the sol-gel process of the present invention, the process proceeds in a number of stages. In the first stage, a solution of the mixture is produced which can include one or more alkoxides and/or metallic compounds therein.

In the solution-based or sol-gel process for preparation of the thin films of the present invention, the process is initiated by the dissolution of the ingredients including one or more alkoxides or their equivalents and/or metallic compounds. The next step is coating of the substrate or of a layer of material already deposited upon the substrate, such as by spin coating, dipping or the like, preferably on a transparent glass or plastic substrate. The next step constitute simultaneous hydrolysis and drying. The hydrolysis step preferably comprises evaporation of the solvent in a controlled environment. Thus, an environment of controlled humidity conditions can be utilized. On the other hand, this environment can be controlled by regulating the partial pressure of the solvent. In either of these cases, the critical element is the pressure of water (or possible another hydroxyl-containing hydrolysis initiator as discussed above). While it is theoretically possible to add the hydroxyl-containing compound, such as water, to the solution itself, this procedure is generally not useful because of the instability of the solutions in question. Thus, the preferred method hereof includes creation of a film and then effecting hydrolysis by contact with water, such as in a controlled humidity environment and the like. As noted above, the partial pressure of the solvent might also be controlled in that environment to further control the rate of hydrolysis. Finally, heat treatment is effected in order to eliminate solvents and water and to promote film condensation. In any event, upon completion of the gelatin process, the ion-conducting layer (or other such layer if so prepared) consists of an inorganic porous structure, but with residual hydroxyl groups and/or organic materials, such as carbon constituents, associated therewith. Again, the presence of these residual organics has not been found to have any adverse effect upon the nature and operation of these electrochromic devices.

By producing at least the ion-conducting layer of the present devices in accordance with this technique, particularly as compared to the prior deposition of ion-conducting layers by sputtering or the like, and/or the use of various polymeric electrolyte systems, it is possible to create interconnected networks of channels to yield higher ionic conductivities therein. Furthermore, applicants have obtained a highly uniform coating, since the entire surface is wetted by this technique, particularly as compared to prior techniques such as sputtering and the like. Therefore, the interface between this ion-conducting layer and adjacent layers will be highly diffuse, whereas with conventional thin film techniques a sharp or non-diffuse interface will be produced. In addition, a high film formation rate and a uniform chemical composition can be obtained hereby. Also, high process temperatures are not required in accordance with this invention. In fact, lithium-based electrochromic devices can be prepared in accordance with the present invention at temperatures lower than about 200° C.

In order to more fully appreciate the present invention, reference is made to the following examples thereof.

EXAMPLE 1

An electrochromic layer 20 in accordance with the present invention can be produced by dissolving a metal alkoxide, such as tungsten or molybdenum alkoxide, in an organic solvent such as an alcohol. The solvent can then be evaporated in a controlled atmosphere to produce a condensed coating. The coating can then be heated to convert it to a hardened layer, such as tungsten oxide or molybdenum oxide.

EXAMPLE 2

Another method of producing an electrochromic layer of tungsten oxide in accordance with the present invention is by employing tungsten ethoxide ($W(OC_2H_5)_5$) in an amount of 200 cc of dry ethanol. The solution can, if necessary, be further diluted with ethanol, and then coated upon a substrate with a controlled thickness. The coating can then be hydrolyzed and dried, leaving a residue which is then heated at a rate of about 50° C. per minute for about 10 minutes to below 500° C. The substrate can then be baked at this temperature for an additional 20 minutes, and then cooled at a similar rate of about 50° C. per minute. A clear, hardened, transparent layer of tungsten oxide can then be obtained.

EXAMPLE 3

In order to manufacture an ion-conductor layer 22 in accordance with the present invention, a metal alkoxide, nitrate or halide, such as a lithium alkoxide (e.g., lithium methoxide), lithium nitrate or lithium chloride can be dissolved in an organic solvent to which is added TEOS. If a second component is to be included in the layer, such as zirconium, aluminum or titanium, an alkoxide and/or a metallic salt of zirconium, aluminum or titanium can then be added, and the solution maintained at suitable temperatures. The coating step can then be carried out, after which the solvent can be evaporated in the presence of moisture to produce the hydrolyzed gel. Finally, the gel can be heated, preferably at temperatures ranging up to about 300° C., in order to produce a hardened layer of lithium silicate or a lithium-containing glass.

EXAMPLE 4

A counterelectrode layer 24 can be produced in accordance with the sol-gel procedures hereof by dissolving a metal alkoxide such as vanadium isopropoxide in an organic solvent such as an alcohol. The coating can then be obtained from this solution, hydrolyzed and then heat treated to produce a hardened film of vanadium oxide.

EXAMPLE 5

Another counterelectrode layer 24 in accordance with this invention can be prepared by dissolving a mixture of vanadium triisopropoxide, oxide and chromium isopropoxide in methanol. The substrate can then be dipped into the solution at a controlled rate in a controlled atmosphere. After hydrolyzing and heat treating, a dense film of vanadium and chromium oxide can be obtained.

EXAMPLE 6

An electrochromic device is produced in accordance with the method of the present invention by sequential deposition of the layers of the electrochromic device onto a glass substrate. Thus, the substrate can first be coated with fluorine doped tin oxide by chemical vapor deposition of tin tetrachloride, 1,1 difluoroethane, and water in a nitrogen atmosphere, at 590° C. Electrochromic layer 20 can then be deposited by depositing a tungsten oxide coating onto the substrate by reactive sputtering of tungsten in the presence of argon and oxygen. Subsequently, the ion-conducting layer of the present invention can be applied from a solution in accordance with the method of this invention by mixing lithium methoxide with TEOS in ethanol, and then coating the substrate at a controlled rate by dipping in this solution. The coating layer can then be hydrolyzed and heat treated at a temperature of 300° C. to produce a hardened layer of lithium silicate. A counterelectrode layer 24 can then be applied thereto by applying a vanadium oxide layer by reactive sputtering of vanadium in the presence of argon and oxygen. The vanadium oxide layer can then be reduced by the application of lithium ions thereto. Subsequently, another layer of transparent conductive oxide can be applied by sputtering indium tin oxide. The entire device can then be heat treated in a vacuum at 250° C., and then laminated to a secondary glass substrate utilizing a layer of ethylene vinyl acetate.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A method for the preparation of an electrochromic device deposited on a substrate comprising depositing one of an electrochromic layer acting as a first electrode or a counterelectrode layer acting as a second electrode on said substrate, thereby providing a deposited electrode, depositing an ion-conducting layer on said deposited electrode by depositing said ion-conducting layer on said deposited electrode in the form of an ion-conducting layer precursor solution and effecting gelation of said ion-conducting layer precursor solution, and depositing said other of said first and second electrodes on said ion-conducting layer.

2. The method of claim 1 wherein said substrate comprises glass.

3. The method of claim 1 wherein said ion-conducting layer precursor solution includes at least one metal in the form of a metal organic or a metal salt compound.

4. The method of claim 3 wherein said metal organic compound comprises a metal alkoxide.

5. The method of claim 3 wherein said ion-conducting layer comprises a lithium ion-conducting layer.

6. The method of claim 5 wherein said ion-conducting layer precursor solution includes an alkali metal in the form of an alkali metal alkoxide compound.

7. The method of claim 6 wherein said alkali metal comprises lithium.

8. The method of claim 7 wherein said lithium-based ceramic material is selected from the group consisting of lithium silicate, lithium borosilicate, lithium aluminum silicate, lithium niobate, lithium nitride, and lithium aluminum fluoride.

9. The method of claim 8 wherein said lithium-based ceramic material comprises lithium silicate.

10. The method of claim 5 wherein said lithium-ion-conducting layer comprises a lithium-based ceramic material.

11. The method of claim 1 wherein said ion-conducting layer is in direct contact with and electrically insulates said first and second electrodes.

12. The method of claim 1 wherein said depositing of said electrochromic layer comprises depositing said electrochromic layer in the form of an electrochromic layer precursor solution and effecting gelation of said electrochromic layer precursor solution.

13. The method of claim 12 wherein both said ion-conducting layer precursor solution and said electrochromic layer precursor solution include at least one metal in the form of a metal organic or a metal salt compound.

14. The method of claim 13 wherein said metal organic compound comprises a metal alkoxide.

15. The method of claim 13 wherein said metal of said electrochromic layer precursor solution is selected from the group consisting of tungsten, niobium, titanium, molybdenum, nickel, iridium, and mixtures thereof.

16. The method of claim 1 wherein said depositing of said counterelectrode layer comprises depositing said counterelectrode layer in the form of a counterelectrode layer precursor solution and effecting gelation of said counterelectrode layer precursor solution.

17. The method of claim 16 wherein both said ion-conducting layer precursor solution and said counterelectrode layer precursor solution include at least one metal in the form of a metal organic or a metal salt compound.

18. The method of claim 17 wherein said metal organic compound comprises a metal alkoxide.

19. The method of claim 17 wherein said metal of said counterelectrode layer precursor solution is selected from the group consisting of vanadium, niobium, nickel, cobalt, molybdenum, and mixtures thereof.

20. The method of claim 1 including reducing at least one of said electrochromic layer and said counterelectrode layer by inserting said ions thereinto.

21. The method of claim 20 wherein said reducing step is effected during said depositing of said at least one of said electrochromic and said counterelectrode layers.

22. The method of claim 20 wherein said ions are selected from the group consisting of lithium and protons.

23. The method of claim 20 including subsequently subjecting said at least one of said electrochromic layer and said counter electrode layer to a heat treatment step.

24. The method of claim 23 comprising conducting said heat treatment step in a vacuum or in an inert atmosphere.

25. The method of claim 23 comprising conducting said heat treatment step at a temperature of greater than about 100° C.

26. The method of claim 23 comprising conducting said heat treatment step at a temperature of greater than about 150° C.

27. A method for the preparation of an electrochromic device deposited on a substrate depositing one of an electrochromic layer acting as a first electrode or depositing a counterelectrode layer acting as a second electrode on said substrate, thereby providing a deposited electrode, depositing an ion-conducting layer on deposited electrode by depositing said ion-conducting layer in the form of an ion-conducting layer precursor solution and effecting gelation of said ion-conducting layer precursor solution by applying said ion-conducting layer precursor solution to said deposited electrode and effecting hydrolysis of said ion-conducting layer precursor solution thereon, and depositing said other of said first and second electrodes on said ion-conducting layer.

28. The method of claim 27 wherein said applying of said ion-conducting layer precursor solution to said first or second electrode includes removing said substrate from said ion-conducting layer precursor solution at a controlled rate so as to obtain a coating of controlled thickness thereon.

29. The method of claim 28 wherein said hydrolysis step comprises exposing said substrate containing a coating of said ion-conducting precursor solution thereon to a controlled environment.

30. The method of claim 29 wherein said controlled environment comprises a controlled humidity environment.

31. The method of claim 27 including heating said hydrolyzed ion-conducting layer precursor solution.

* * * * *